Aug. 5, 1930.  V. K. JONES ET AL  1,772,007
ILLUMINATING GAUGE DEVICE
Filed Dec. 7, 1929
Fig. 1.
Fig. 2.
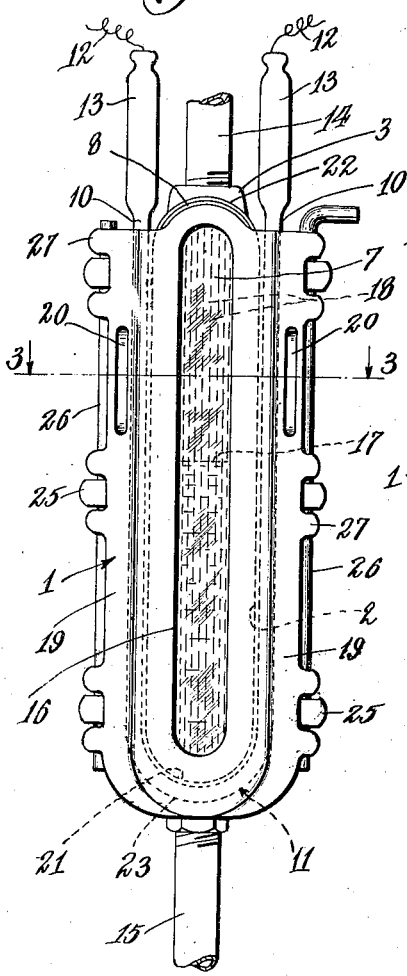
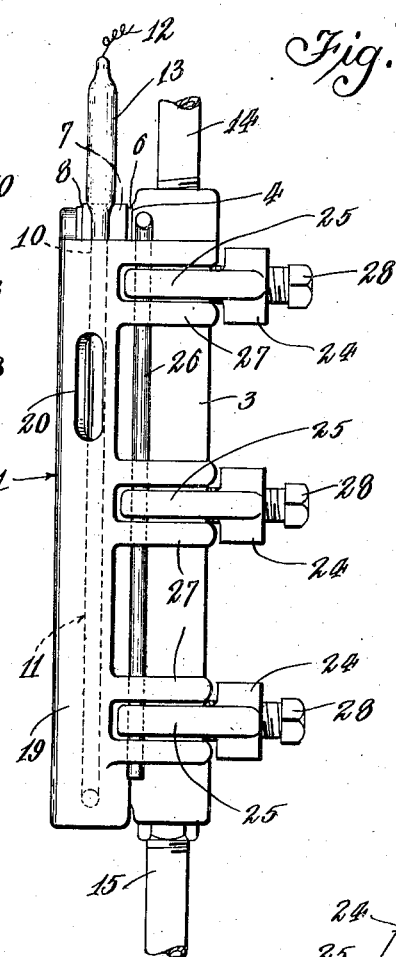
Fig. 3.
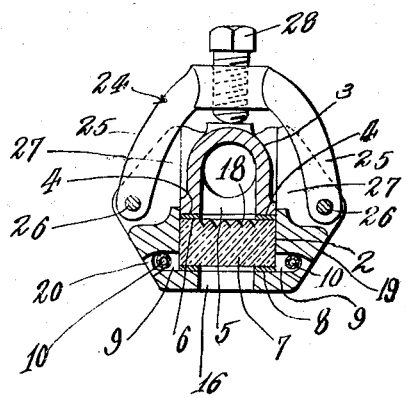
Inventors
Virgil K. Jones
Cecil Van Wyck
By Lyon & Lyon
Attorneys Patented Aug. 5, 1930

1,772,007

UNITED STATES PATENT OFFICE

VIRGIL K. JONES AND CECIL VAN WYCK, OF LOS ANGELES, CALIFORNIA

ILLUMINATING GAUGE DEVICE

Application filed December 7, 1929. Serial No. 412,541.

This invention relates to a gauge device and while features of this invention may be applied to gauge devices employed for any purpose, the invention is particularly applicable in the construction of sight gauges employed in connection with boilers for indicating the water level. As usually constructed such gauges have their glass illuminated from the exterior and the reflection on the front of the glass detracts from the visibility of the water line. Furthermore, in such gauges there may be considerable deposit on the interior of the gauge glass due to impurities in the water and this also interferes with the visibility of the water line.

The general object of this invention is to produce a gauge having special features of construction increasing its efficiency and particularly the visibility of the water line indicated in the gauge.

Also to provide a gauge of this type which is capable of providing illumination in the boiler room or other locality in the vicinity of the gauge.

Further objects of the invention will appear hereinafter.

The invention consists in the novel parts and combinations of parts to be described, hereinafter, all of which contribute to produce an efficient illuminated gauge device.

A preferred embodiment of the invention is described in the following specification, while the broad scope of the invention is pointed out in the appended claims.

In the drawing Fig. 1 is a front elevation of a gauge device embodying our invention and showing portions of the pipes that connect the same with a boiler, broken away.

Fig. 2 is a side elevation of the gauge device illustrated in Fig. 1.

Fig. 3 is a horizontal cross-section taken on the line 3—3 of Fig. 1.

In practicing the invention, we provide a body 1 which is preferably formed of cast iron or other suitable metal. In adapting the invention to a boiler level gauge, the body 1 should be of elongated form and provided on its rear side with a longitudinal pocket 2 to receive a gauge tube which is received in the pocket and extends longitudinally thereof.

This gauge tube 3 is open on its forward side and is formed so as to present two seat faces 4 on each side of its front opening 5, which seat faces seat against a suitable gasket 6 on the rear side of a translucent front plate 7. This gasket 6 is employed, of course, to make the gauge steam-tight and I prefer to employ a similar gasket 8 against which the forward face of the front plate 7 seats at the bottom of the pocket 2.

On each side of the front plate 7 the body is provided with a recess 9 and these recesses open into the side edges of the pocket or socket 2 that carries the front plate 7 of the gauge. In these recesses are received the parallel legs 10 of a U-tube 11 which is constructed as an illuminating tube preferably of the neon type, that is to say, it carries a gaseous illuminating medium excited by an electric circuit through terminal wires 12 as indicated in Fig. 1 embedded in suitable insulating heads 13 at the upper ends of the legs 10 that project beyond the upper end of the gauge plate. The ends of the gauge tube 3 are formed with threads to receive pipe connections 14 and 15 that connect with the boiler above and below the water level.

The forward face of the body 1 is provided with a sight opening 16 through which the water level 17 in the gauge may be observed. The inner face of the front plate or face plate 7 is provided with projections preferably in the form of pyramidal longitudinal corrugations 18 which refract and reflect the light coming in from the legs of the tube through the sides of the pocket 2. In this way the water line 17 is made plainly visible.

If desired, the gauge can readily be adapted to illuminate its vicinity in the boiler room or any other locality in which the gauge may be mounted. For this purpose the side faces 19 of the body (see Fig. 3) are provided with openings 20 that communicate with the recesses 9. These faces 19 are preferably inclined as shown so that the light passing through the windows 20 will be cast forwardly and laterally.

The ends of the face plate 7 are preferably formed with rounded faces as indicated by the lines at 21 and 22. The face 21 is struck on a radius slightly smaller than that of the U-shaped bend 23 of the U-tube that provides the illumination for the gauge.

Suitable means is provided for clamping the gauge tube 3 with great force against the rear face of the face plate 7. For this purpose the rear side of the body 1 is provided with a plurality of yokes 24 which have forwardly projecting arms 25 connected by removable pins 26 with lugs 27 cast on the rear side of the body.

The yoke 24 is provided with a set screw 28 the tip of which seats against a boss on the back of the gauge tube 3. Evidently by tightening up these set screws 28 the gauge tube can be very firmly clamped against the face plate 7.

It will be evident that in reading this gauge the water line 17 will be made plainly visible by reason of the light rays passing from the legs 10 of the illuminated tube through the side edges of the face plate 7. It is found that with a face plate having its rear face provided with projections or corrugations such as indicated, the water level will be plainly visible.

The corrugations on the inner side of the face plate 7 give considerable illumination to the interior of the gauge above the water line but the water column prevents a large part of the reflection and causes the water column end of the gauge to be relatively dark. In this way the reading of the gauge is made very easy and the gauge is read more by the varying length of the two columns than by depending upon a single indicated water level line. This is most advantageous as compared with gauges for this purpose as ordinarily constructed.

It is understood that the embodiment of the invention described herein is only one of the many embodiments this invention may take, and we do not wish to be limited in the practice of the invention, nor in the claims, to the particular embodiment set forth.

We claim:

1. In a device of the kind described, the combination of a body, a gauge tube supported in the said body with a translucent face plate having projections on its inner face, an illuminating tube having two connected legs mounted in the body so that said legs extend along opposite sides of the said face plate, and mounted so as to cast rays laterally through the side edges of the said face plate.

2. In a device of the kind described, the combination of a body, a gauge tube supported in the said body with a translucent face plate having projections on its inner face, an illuminating tube having two connected legs mounted in the body so that said legs extend along opposite sides of the said face plate, and so as to cast rays laterally through the side edges of the said face plate, said body having a sight opening for observing the gauge tube through the said face plate.

3. In a device of the kind described, the combination of a body, a gauge tube supported in the said body open on its forward side, a translucent face plate disposed against the said open side and having projections on its inner face, an illuminating tube having two connected legs mounted in the body so that said legs extend along the opposite sides of the said face plate and so as to cast rays laterally through the side edges of the said face plate.

4. In a device of the kind described, the combination of an elongated body having a longitudinally extending pocket formed on the rear side thereof, a gauge glass front plate received in said pocket, a gauge tube seating against the rear face of said front plate, means for clamping the tube against the said front plate, said pocket having recesses on the sides thereof, and an illuminating tube having two connected legs received in the said recesses and casting their rays laterally into the said front plate, said front plate having prismatic corrugations on the inner face thereof.

5. In a device of the kind described, the combination of an elongated body having a longitudinally extending pocket formed on the rear side thereof, a gauge glass front plate received in said pocket, a gauge tube seating against the rear face of said front plate, means for clamping the tube against the said front plate, said pocket having recesses on the sides thereof, an illuminating tube having two connected legs received in the said recesses and casting their rays laterally into the said front plate, said front plate having prismatic corrugations on the inner face thereof, and the forward side of said body having a sight opening therethrough for observing the water level in the gauge tube.

6. In a device of the kind described, the combination of an elongated body having a longitudinally extending pocket formed on the rear side thereof, a gauge glass front plate received in said pocket, a gauge tube seating against the rear face of said front plate, means for clamping the tube against the said front plate, said pocket having recesses on the sides thereof, an illuminating tube having two connected legs received in the said recesses and casting their rays laterally into the said front plate, said front plate having prismatic corrugations on the inner face thereof, said body having laterally disposed openings emerging on its sides and communicating with said recesses to enable the legs of the tube to cast rays laterally outwardly to illuminate the vicinity of the device.

7. In a device of the kind described, the combination of a body, a translucent front plate, a gauge tube seating against the rear face thereof and an illuminating tube carried in said body, extending along the side edge of said translucent plate and casting its rays laterally into said front plate.

Signed at Los Angeles, California, this 30 day of November 1929.

VIRGIL K. JONES.
CECIL van WYCK.